D. H. WILSON.
APPARATUS FOR CHARGING STORAGE BATTERIES.
APPLICATION FILED APR. 16, 1912. RENEWED SEPT. 16, 1916.
1,224,986.
Patented May 8, 1917.
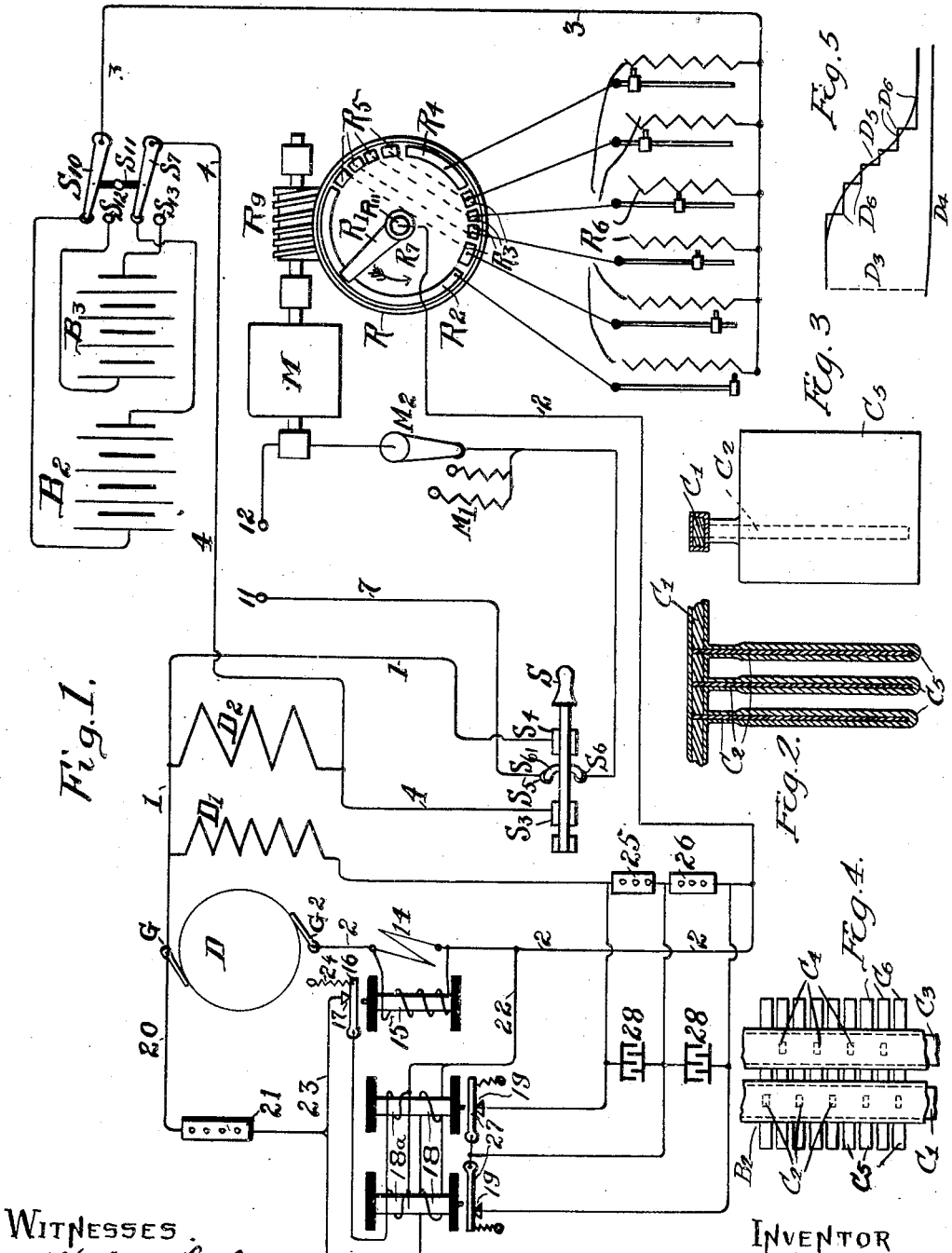

UNITED STATES PATENT OFFICE.

DAVID H. WILSON, OF RIDGEWOOD, NEW JERSEY, ASSIGNOR TO WILSON STORAGE BATTERY COMPANY, OF NEW YORK, N. Y., A CORPORATION OF NEW YORK.

APPARATUS FOR CHARGING STORAGE BATTERIES.

1,224,986.  Specification of Letters Patent.  Patented May 8, 1917.

Application filed April 16, 1912, Serial No. 691,198. Renewed September 16, 1916. Serial No. 120,589.

*To all whom it may concern:*

Be it known that I, DAVID H. WILSON, citizen of the United States, and resident of Ridgewood, in the county of Bergen and State of New Jersey, have invented certain new and useful Apparatus for Charging Storage Batteries, of which the following is a specification.

My invention consists of apparatus for charging storage batteries which has many advantages over systems heretofore proposed.

One of the objects of my invention is to apply the charging current to the battery being charged, gradually from low to high, and also from high to low amperage, the changes taking place gradually and conforming as far as practicable, particularly when being reduced, to the curve representing the changing rate at which the battery may be charged as the charge progresses, to the most efficient degree.

A further object is to reduce the charging current to a very low degree to allow the gases created by the charging to be dissipated, after which the current may again be increased to a high degree.

The changes in the battery current consists largely in variations of amperage.

This process may be used once or it may be repeated, according to conditions.

Another object of my invention is to evenly distribute the charge over the plates and corrugations and extend it from the outer portions of the corrugations to the innermost corners.

A still further object of my invention is to cause the charge to penetrate into the plates to a considerable depth and to penetrate more or less evenly over the whole corrugated surfaces of the plates, thus preventing shedding of the plates. In some batteries the active material is in the form of thin ribs. In such batteries, when charged with a low charging current, the charge gathers upon the outer edges of the ribs; and their inner edges where they are connected to the lead or other stiffer portions of the plate, sometimes break away, causing the active material to scale off, or shed.

My heavy charging current by penetrating to the innermost recesses between the ribs, more firmly uniting them to the stiffer portions of the plate, prevents the scaling or shedding of the ribs.

Another object of my invention is to distribute the current evenly through the plates in such a way as to prevent their buckling. This is assisted by running an electrical distributer of high conductivity and considerable surface area into the interior of the plates in such a way as to enlarge the area of contact between each distributer and its plate. This enlarged area of contact and the proper location of the distributers also prevent heating. The area of contact between the distributers and plates is proportional to the active area of the plates and the maximum charging current to insure these results.

Another object of my invention is to graduate the changes of current from low to high and high to low amperage in such a way as not to interfere with the general working of the circuit and its efficiency, and to prevent any reversal of the field coils of the charging machine, or short circuiting of the battery through the charging machine.

Another object of my invention is to time the charging current to get the quickest and best results. This may be done by a motor and hand switch or rheostat. The motor may drive an "automatic resistance" varying device which cuts in and out various resistances in the external or charging circuit (as distinguished from the shunt circuit containing the shunt field coil), and thus manipulates the charging circuits.

A further object of my invention is to so arrange the circuits that they may be used for charging ordinary storage batteries in the ordinary way, and at any time to be switched from either method of charging to the other.

In the drawings;

Figure 1 shows in diagram, my circuits and apparatus switched for charging my special battery.

Fig. 2 is a sectional view of a series of my special battery plates.

Fig. 3 is a side elevation of one of said plates.

Fig. 4 is a plan view of both series of plates showing the manner of connecting them up.

Fig. 5 is a diagram showing the curve of the charging current.

In Fig. 1 the circuits are shown switched into such a state as to charge my special storage battery, of the type shown in the other figures. When the switch S is thrown to the position shown in this figure it accomplishes two functions. First, the charging machine is connected to the battery $B^2$ over the following circuit: brush $G^2$ of the charging machine D, conductor 2, brush $R^1$ of the automatic resistance varying device R, contact plate $R^2$ of the said automatic resistance varying device R, one of the resistance coils $R^6$, connected between the plate $R^2$ and the conductor 3, thence to switch lever $S^{11}$, battery $B^2$, conductor 4, contact points $S^3$ and $S^4$, conductor 1, to the brush $G^1$. And second, the series coil $D^2$ is short circuited by the conductors 1 and 4 running to the contacts $S^3$ and $S^4$ respectively, which are united together by the switch lever S.

The switch lever also connects together the contacts $S^5$ and $S^6$ by means of the bridge contact piece $S^{61}$, which is mounted upon but insulated from the switch lever S.

The circuit thus established is traced from the current terminal 11, over the conductor 7, switch lever S, rheostat M armature of the motor M, to the terminal 12. The current supplied at the terminals 11 and 12 may be of any character suitable to run the motor M. This motor turns the worm gear $R^9$ which operates the brush $R^1$ mounted upon the shaft $R^{11}$ which carries the brush $R^1$. The brush $R^1$ travels in the direction of the arrow $R^7$ (see Fig. 1) and when the brush rests upon the contact plate $R^2$, the heaviest current is delivered to the battery $B^2$. As the brush $R^1$ travels over the contact plates $R^3$ greater resistances $R^6$ are introduced into the circuit thus cutting down the current delivered to the battery. The speed at which the brush $R^1$ travels may be varied by means of the handle $M^2$ of the rheostat $M^1$ between wide limits. The motor M may travel at an exceedingly slow speed, or at a rapid rate as may be desired. The speed may be rapid when increasing the amount of current delivered to the battery as the brush travels from contact plate $R^4$ over contact plates $R^5$ to $R^2$, and then travel very slowly over contact plates $R^3$. This may be accomplished by means of the handle $M^2$ of the rheostat. Various other devices may be used to increase the range of speed of the motor M.

When the brush $R^1$ reaches the contact plate $R^4$, the highest resistance $R^6$ is introduced into the circuit thus reducing the amperage to the lowest degree. The coils $R^6$ having varying degrees of resistance, vary the resistance of the external circuit and hence vary the amount of current delivered to the battery.

These resistances may vary in accordance with the circumstances and conditions of use, the kind of battery to be charged, and the speed at which it is desired to be charged.

The time of charging may be varied at will by means of the rheostat $M^1$, by means of which the speed of the motor M may be changed so that the automatic resistance varying device R is timed to give the best results in connection with the particular sizes and designs of the batteries to be charged.

When it is desired to convert the charging machine so that it may be used in connection with ordinary batteries of low charging capacity, the motor M is stopped at that point where the lower resistance $R^6$ is in circuit; and the lever S is thrown over, thereby opening the short circuit around the series field winding, this switching the series field coil $D^2$ into the external circuit, so that the charging machine may be used as one having a compound winding suitable for ordinary charging work, where it is used to charge batteries in multiple.

The compound switch lever $S^{11}$ is then thrown over so that the switch lever $S^{10}$ engages the contact point $S^{12}$ and the switch lever $S^7$ engages the contact point $S^{13}$, thereby introducing the battery of the ordinary type $B^3$ into the circuit of the dynamo. The current is then delivered from the charging machine from the brush $G^1$ through the series field coil $D^2$, conductor $d$, switch lever $S^7$, contact point $S^{13}$, battery $B^3$, contact point $S^{12}$, switch lever $S^{10}$, and conductor 3, automatic resistance R, conductor 2, back to the brush $G^2$.

Figs. 2 and 3 show one set of plates having the buss bars $C^1$ of copper or of other metal of low resistance, electrically united to the distributers $C^2$ which extend into the interior of the plate $C^5$. These copper conductors are preferably covered with lead of a non-porous nature, applied in hot plastic or liquid state by hydraulic or other heavy pressure between dies, and thereby protected from the acids of the battery.

In Fig. 3 is shown a side elevation of one of the plates $C^5$. The distributer $C^2$ is shown passing through the plate in one of its two longest dimensions. It may pass into the plate in any other way by means of which it has a large area of contact between the copper and the lead, thereby giving a large collecting surface for the copper conductors from the lead portions of the plate.

Fig. 2 shows a section of the set of plates shown in Fig. 3, having the buss bars connected to the distributers of low resistance metal, extending into the interior of plates.

The top view, Fig. 4, shows how the buss bars $C^1$ and $C^3$ are alternated with each other so as to furnish paths for the current of more or less equal resistance from the distributers of one set of plates to the distributers of the other set of plates.

In my apparatus if an empty storage battery is suddenly connected to the charging circuit it is possible that the generator may develop too great an amperage for the battery. In this case it is desirable to introduce a regulator to prevent an over heavy charging current. For this purpose I have introduced in the main conductor a low resistance coil 14 and in shunt with this coil an electro-magnetic switch having a coil 15 and armature 16, and a contact 14.

When an excess of current flows over the main conductor 2 the pull of the coil 15 overpowers the pull of the spring 24 so that the armature 16 leaves the contact 17. This has the effect of introducing the resistances 25 and 26 and as many more as may be desired into the circuit of the shunt field coil $D^1$. This is accomplished through relays which by attracting the armatures 27 open the circuits at 19, thereby opening the short circuits around the aforesaid resistances 25 and 26. Thereupon current flows from the charging machine D over the conductor 20 through the resistance 21, coils 18 and conductor 22 back to the charging machine D. This circuit is bridged across the charging machine and is counted upon to energize the relay coils 18 to attract the armature 27 when the circuit is open at 17. When the current from the charging machine has dropped below the required point the pull of the spring 24 overpowers the coil 15 and closes the circuit at contact 17 causing current to flow from the charging machine through conductor 20, resistance 21, conductor 23, contact 17, relay neutralizing coils $18^a$, conductor 22 and back to the charging machine. These neutralizing coils $18^a$ have the effect of instantly neutralizing the magnetic effect of the coils 18 thereby releasing the armature 27 and closing the circuits at contacts 19, thereby shortcircuiting the resistances 25 and 26. When the resistances are short-circuited a greater amount of current flows through the shunt field coil $D^1$ which increases the output of the charging machine.

When the short-circuits around the resistances 25 and 26 are opened the discharge is absorbed by condensers 28 which are bridged across the contacts.

By means of these circuits the output of the charging machine is, when the brush $R^1$ of the automatic resistance varying device R rests upon the contact $R^2$ maintained at a steady point. When the brush $R^1$ travels over contact $R^5$, $R^4$, and $R^3$, or at least when the output of the charging machine is reduced below the maximum point, the regulator has no influence upon the operation of my apparatus. The various resistances and shunts are adjusted in accordance with ordinary engineering skill to secure these results.

In place of the resistances 25 and 26 any other resistances may be substituted, as long as these resistances influence the current flowing through the conductor.

It is quite possible to use a single resistance 25 or as many resistances as the construction of the apparatus and the output of the charging machine may require for efficient operation.

Fig. 5 shows a diagram of the curve at which most efficient charging takes place. The line $D^3$ indicates the quantity delivered to the battery at the moment of heaviest charging. The line $D^4$ indicates zero. The curve $D^5$ is the theoretical curve of charging at highest rate, and the line $D^6$ represents the changes in the quantity of charging current actually delivered to the battery.

Many variations of my apparatus may be employed. Any other suitable device for varying the current may be employed in place of the automatic resistance varying device R. Many other variations may be made in my apparatus without departing from the spirit of my invention.

I claim—

1. In combination with a storage battery and an external or charging circuit of a charging machine, time controlled automatic means in said external circuit adapted to reduce the current flow in said external circuit, step by step.

2. In combination, an external or charging circuit of a charging machine, a storage battery, time controlled automatic means in said external circuit adapted to reduce the current flow in said external circuit step by step, means to regulate the speed of said automatic means to gradually diminish the flow of current into said battery.

3. In combination, an external or charging circuit of a charging machine, a storage battery, a time controlled automatic resistance varying device adapted to increase and reduce the current flow in said external circuit step by step.

4. In combination, a storage battery, an external or charging circuit of a charging machine, a shunt winding in shunt thereof, a time controlled automatic resistance varying device adapted to reduce the current flow in said external circuit step by step, and means to regulate the speed of said automatic resistance varying device to gradually diminish the flow of current into said battery.

5. In combination a storage battery, an external or charging circuit of a charging machine, time controlled means in said external circuit adapted to reduce the current flow in said external circuit step by step, and a regulator to prevent an excess of current from flowing into said battery.

6. In combination, a storage battery, an external or charging circuit of a charging machine, time controlled means in said external circuit adapted to reduce the current flow in said external circuit step by step, a regulator to prevent an excess of current from flowing into said battery located in said external circuit.

7. In combination with a storage battery, an external or charging circuit of a charging machine, a time controlled automatic resistance varying device in said external circuit adapted to reduce the current flow in said external circuit, means to regulate the speed of said automatic resistance varying device, to gradually diminish the flow of current into said battery, a regulator to prevent an excess of current from flowing into said battery.

Signed at New York, in the county of New York and State of New York, this 17th day of January, A. D. 1912.

DAVID H. WILSON.

Witnesses:
MYRON F. HILL,
A. L. TRAVIS.